3,346,513
ACTIVATION OF ANTIMONY OXIDE-TIN OXIDE CATALYSTS USING WATER ACID OR BASE
David James Hadley, Epsom Downs, Surrey, England, assignor to The Distillers Company Limited, Edinburgh, Scotland, a British company
No Drawing. Filed May 26, 1964, Ser. No. 370,348
Claims priority, application Great Britain, June 20, 1963, 24,513/63
9 Claims. (Cl. 252—461)

The present invention relates to a process for the activation of catalytic compositions and in particular to a process for the activation of a catalytic composition for use in oxidation reaction.

Catalytic compositions comprising tin and antimony metal oxides have been proposed for use in catalysing such reactions as the oxidation of mono-olefines to unsaturated aldehydes, e.g. the oxidation of propylene to acrolein, the conversion of mono-olefines to unsaturated nitriles in the presence of oxygen and ammonia, e.g. the conversion of propylene to acrylonitrile, the oxidative dehydrogenation of mono-olefines to conjugated diolefines, e.g. the conversion of butene to butadiene, and the conversion of methanol to hydrogen cyanide in the presence of oxygen and ammonia. Copending U.S. application Ser. No. 266,034, now Patent No. 3,258,432, describes such a catalytic composition which comprises antimony tetroxide in combination or in admixture with stannic oxide. This composition may be regarded either as a mixture of antimony tetroxide with stannic oxide or as a compound of antimony, tin and oxygen; under the reaction conditions either or both forms may be present in the catalyst. The composition may be prepared by forming a mixture of the oxides of antimony and tin, of which the tin oxide at least is obtained by the action of aqueous nitric acid on the metal, or by forming a mixture of such oxides in which at least the tin oxide is obtained by hydrolysis of a cationic salt of the metal. The resultant mixtures are washed and dried, pelleted and may then be subjected to a heat treatment in the presence of molecular oxygen at a temperature in the range 500 to 1100° C.

It has now been found possible to increase the activity of the pelleted, heat-treated catalyst.

Accordingly the present invention is a process for the activation of a catalytic composition comprising antimony tetroxide in combination or in admixture with stannic oxide in granular or pelleted form as claimed in application Ser. No. 266,034, now Patent No. 3,258,432, and heat-treated in the presence of molecular oxygen at a temperature in the range 500 to 1100° C. which comprises contacting subsequent to the heat treatment the granular or pelleted composition with water or aqueous solutions of acids or bases substantially at the boiling point.

The catalytic composition may be prepared by any of the methods described in application Ser. No. 266,034, now Patent No. 3,258,432. Preferably however the composition is prepared by forming a mixture of the oxides of the tin and antimony in which at least the tin oxide is obtained by the action of nitric acid on tin metal. For example such compositions may be obtained by digesting powdered tin and antimony metal with nitric acid either separately followed by admixture of the resultant suspensions or by the successive addition of tin and antimony metals to the same nitric acid solution. The resultant precipitate obtained by either method of preparation is then washed several times, one washing at least involving contacting the precipitate with boiling water for instance for one hour, the supernatent liquid being decanted or filtered off between washings. Preferably the precipitate is washed first with cold water then contacted with boiling water for about one hour, and finally washed again with cold water. The washed precipitate is finally isolated by filtration and is dried. The catalyst is then admixed with a suitable lubricant e.g. graphite and the mixture pelleted, the pellets being finally heated to a temperature in the range 550 to 1100° C. in the presence of molecular oxygen.

The granular or pelleted catalyst is then contacted according to this invention with boiling water or an aqueous solution of an acid or base for preferably 0.5–7 hours. The boiling may be carried out at atmospheric pressure, or at pressures below or above atmospheric. Atmospheric pressure is preferred.

The process of the present invention is illustrated further with reference to the following examples.

The quantity of water or aqueous solution of acid or base used can be varied widely, but we prefer to use about 1 part of water by weight per part of catalyst. A suitable solution of a base comprises a solution of ammonium hydroxide. A suitable solution of an acid comprises an aqueous solution of hydrochloric or acetic acids or the like.

*Example 1*

A tin/antimony oxide catalyst (Ratio Sn:Sb=1:4) was prepared as follows: powdered tin metal was added slowly to a hot stirred mixture of dilute nitric acid whilst concurrently powdered antimony was added slowly to hot stirred concentrated nitric acid. The two resultant mixtures were combined, boiled for about 15 minutes, cooled and filtered. The filter cake was washed with cold water, slurried with boiling water, filtered and finally slurried with cold water and filtered to remove last traces of nitric acid. The precipitate was then dried, admixed with 2% graphite as lubricant and formed into ⅛″ diameter pellets which were then subsequently heated in air at temperatures in the range 500° to 1100° C. for about 16 hours.

The heat treated pellets (54 parts by weight) were contacted with boiling water (100 parts by weight) for 6 hours. The pellets were then dried at 110° C. for 16 hours.

A feed mixture of by volume, 5% propylene, 6% ammonia, 55% air and 34% steam was passed over the pellets contained in an isothermal reactor at 480° C. A yield of acrylonitrile of 60.3% based on the propylene fed was obtained. The surface area of the catalyst was found to be 5.8 metres$^2$/gram.

By way of comparison with this example, a catalyst was prepared as described above except that the final treatment with boiling water was omitted. This catalyst was used to catalyse the reaction of propylene and ammonia in the presence of ammonia in an identical manner to that described above. A yield of acrylonitrile of only 44.2% based on the propylene fed was obtained. The surface area of the catalyst was determined and found to be 5.2 metres$^2$/gram.

*Example 2*

The improvement in catalyst performance and the increase in surface area obtained by treatment in accordance with the present invention is illustrated in the following table, preparation of the catalyst and reaction being carried out under the conditions described in Example 1 above.

| Form of catalyst | Parts by wt. of catalyst | Parts by wt. of water | Time of heating | Surface area of catalyst after treatment, metres²/gram | Percent yield of acrylonitrile |
|---|---|---|---|---|---|
| ⅛" diam. tablets | | | 0 | 7.5 | 58 |
| | 115 | 500 | 1 | 8.9 | 61 |
| 3/16" diam. tablets | | | 0 | 6.7 | 56.5 |
| | 200 | 1,000 | 1 | 7.4 | 60 |
| 5-12 mesh B.S.S. granules | | | 0 | | 35.3 |
| | 51 | 100 | 1 | | 43.3 |
| | 51 | 100 | 6 | | 48 |

*Example 3*

A heat-treated catalyst (53.5 parts by weight) prepared as described in Example 1 above, was boiled for one hour with a 3% solution of ammonia (98.8 parts by weight). The yield of acrylonitrile based on the propylene fed before and after treatment in accordance with the invention was 35.3% and 46% respectively.

*Example 4*

A heat-treated catalyst (51.9 parts by weight) prepared as described in Example 1 above was boiled for one hour with a 3.5% hydrochloric acid solution (101.8 parts by weight). The yield of acrylonitrile based on the propylene fed before and after treatment in accordance with the invention was 35.3% and 46.1 respectively.

I claim:

1. A process for the activation of a catalytic composition selected from the group consisting of (i) antimony tetroxide in combination with stannic oxide and (ii) antimony tetroxide in admixture with stannic oxide in a pelleted form which comprises heat treating the pelleted catalyst in the presence of molecular oxygen at a temperature in the range 500 to 1100° C. and subsequently contacting the catalyst with a substance selected from the group consisting of ordinary water, an aqueous solution of a mineral acid and an aqueous solution of ammonia substantially at the boiling point for a period of about 0.5 to 7 hours.

2. A process as claimed in claim 1 wherein the catalytic composition is prepared by formation of a mixture of the oxides of tin and antimony and in which the tin oxide is obtained by the action of nitric acid on the elemental metal.

3. A process as claimed in claim 2 wherein the catalytic composition is obtained by digestion of powdered tin and antimony metal with separate portions of nitric acid followed by admixture of the resultant suspension.

4. A process as claimed in claim 1 wherein the catalytic composition is prepared by the successive addition of tin and antimony metals to the same nitric acid solution.

5. A process as claimed in claim 3 wherein the resultant composition precipitate is washed several times, one washing at least involving contact of the precipitate with boiling water.

6. A process as claimed in claim 4 wherein the resultant composition precipitate is washed several times, one washing at least involving contact of the precipitate with boiling water.

7. A process as claimed in claim 5 wherein the resultant precipitate is firstly washed with cold water and then with boiling water, and finally again with cold water.

8. A process as claimed in claim 1 wherein the pelleted catalyst is contacted with an aqueous solution of ammonia.

9. A process as claimed in claim 1 wherein the pelleted catalyst is contacted with an aqueous solution of hydrochloric acid.

References Cited

UNITED STATES PATENTS

| | | | |
|---|---|---|---|
| 2,967,185 | 1/1961 | Becker et al. | 252—441 X |
| 3,094,565 | 6/1963 | Bethell et al. | 252—461 X |
| 3,197,419 | 7/1965 | Callahan et al. | 252—461 X |
| 3,210,295 | 10/1965 | Modiano | 252—461 |
| 3,269,957 | 7/1966 | Bethell | 252—461 |
| 3,309,325 | 3/1967 | Gasson | 252—461 |

FOREIGN PATENTS 549,345    11/1957    Canada.

DANIEL E. WYMAN, *Primary Examiner.*

OSCAR R. VERTIZ, *Examiner.*

G. OZAKI, P. E. KONOPKA, *Assistant Examiners.*